(12) United States Patent
Negishi et al.

(10) Patent No.: US 10,979,683 B2
(45) Date of Patent: Apr. 13, 2021

(54) WHITE BALANCE ADJUSTMENT DEVICE AND WHITE BALANCE ADJUSTMENT METHOD

(71) Applicant: Clarion Co., Ltd., Saitama (JP)

(72) Inventors: Takayuki Negishi, Saitama (JP); Hitoshi Takagi, Saitama (JP); Hiromasa Shinsha, Saitama (JP); Satoshi Ikegaya, Saitama (JP); Tsutomu Usui, Saitama (JP); Norihiko Nakano, Saitama (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 16/966,340

(22) PCT Filed: Dec. 26, 2018

(86) PCT No.: PCT/JP2018/047738
§ 371 (c)(1),
(2) Date: Jul. 30, 2020

(87) PCT Pub. No.: WO2019/150860
PCT Pub. Date: Aug. 8, 2019

(65) Prior Publication Data
US 2020/0374500 A1    Nov. 26, 2020

(30) Foreign Application Priority Data
Jan. 30, 2018  (JP) .............................. JP2018-013513

(51) Int. Cl.
*H04N 9/73* (2006.01)
*H04N 17/02* (2006.01)

(52) U.S. Cl.
CPC ............... *H04N 9/73* (2013.01); *H04N 17/02* (2013.01)

(58) Field of Classification Search
CPC ............ H04N 9/73; H04N 9/735; H04N 9/78; H04N 9/77; H04N 9/64; H04N 17/02
(Continued)

(56) References Cited

U.S. PATENT DOCUMENTS

| 2006/0159336 A1 | 7/2006 | Uezono |
| 2009/0041347 A1 | 2/2009 | Iguchi et al. |
| 2011/0158513 A1* | 6/2011 | Kitajima ................... G06T 7/90 382/162 |
| 2014/0240535 A1 | 8/2014 | Iguchi et al. |
| 2015/0195500 A1 | 7/2015 | Usui et al. |

FOREIGN PATENT DOCUMENTS

| EP | 2 882 187 | 6/2015 |
| JP | 9-130815 | 5/1997 |

(Continued)

OTHER PUBLICATIONS

International Search Report dated Feb. 19, 2019 in International (PCT) Application No. PCT/JP2018/047738.
(Continued)

*Primary Examiner* — Sherrie Hsia
(74) *Attorney, Agent, or Firm* — Wenderoth, Lind & Ponack, L.L.P.

(57) ABSTRACT

A white balance adjustment device includes a statistics acquisition portion and a correction portion. The statistics acquisition portion includes an area setting portion including a luminance area setting portion configured to set a plurality of luminance ranges, and an average value calculation portion configured to calculate an average value of color difference values of the image signal in each of the plurality of luminance ranges set by the luminance area setting portion. The correction portion includes a correction function determination portion configured to determine a correction function of the color difference values of the image signal based on the average value of the color difference values calculated by the average value calculation portion, and a color difference correction portion configured to
(Continued)

correct the color difference values of the image signal based on the correction function determined by the correction function determination portion.

5 Claims, 10 Drawing Sheets

(58) Field of Classification Search
USPC .... 348/655, 656, 663, 712, 713, 223.1, 678, 348/679, 688; 382/162, 167; 345/589
See application file for complete search history.

(56) References Cited

FOREIGN PATENT DOCUMENTS

| | | |
|---|---|---|
| JP | 2001-36924 | 2/2001 |
| JP | 2006-203393 | 8/2006 |
| JP | 2009-44681 | 2/2009 |
| JP | 2014-32540 | 2/2014 |
| WO | 2014/021032 | 2/2014 |

OTHER PUBLICATIONS

Written Opinion of the International Searching Authority dated Feb. 19, 2019 in International (PCT) Application No. PCT/JP2018/047738 with English translation.

* cited by examiner

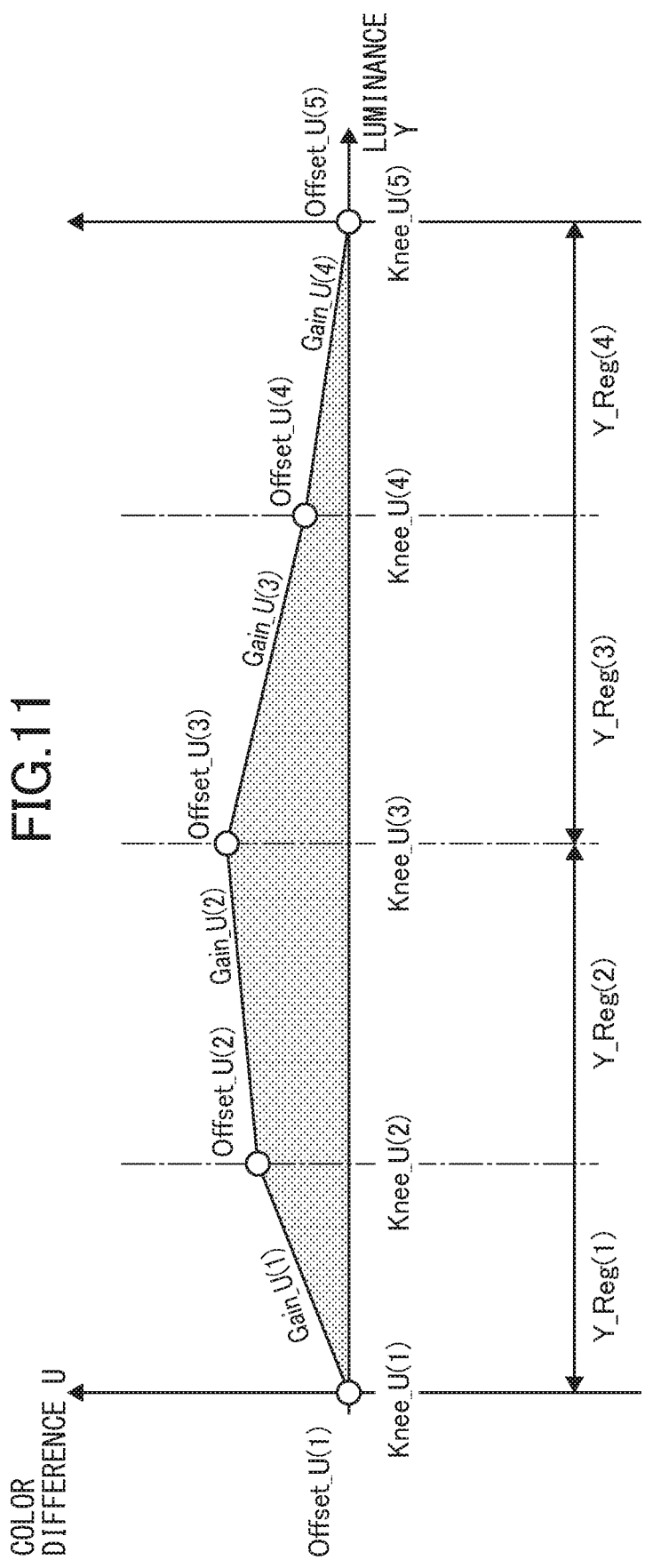

WHITE BALANCE ADJUSTMENT DEVICE AND WHITE BALANCE ADJUSTMENT METHOD

CROSS-REFERENCE TO RELATED APPLICATION

This application is based upon and claims the benefit of priority from Japanese Patent Application No. 2018-13513 filed on Jan. 30, 2018, the entire disclosure of which is incorporated herein by reference.

TECHNICAL FIELD

A present disclosure relates to a white balance adjustment device and a white balance adjustment method that perform white balance adjustment on a received image signal.

BACKGROUND ART

Image signals from an imaging device are often output as values in an RGB color space (RGB values). However, when a white balance adjustment is performed on the RGB values, the brightness of an image or picture after the white balance adjustment may differ from that of the picture before the white balance adjustment. This is based on the fact that an R-value, a G-value, and a B-value are respectively adjusted when the white balance adjustment is performed on the RGB values, and consequently, the brightness of pixels may be changed if the ratio of the RGB values to the pixels changes according to the white balance adjustment.

Therefore, proposals are made with devices and/or methods for the white balance adjustment wherein the RGB values are converted to values (YUV values) in a YUV color space, and only the color saturation (color differences) is adjusted without changing luminance in the YUV color space (see Patent Literatures I: JPH 09-130815 A and Patent Literature II: JP 2001-36924 A, for example). According to such devices and/or methods, the white balance adjustment is performed without changing the brightness of the picture before and after the white balance adjustment.

SUMMARY

However, in the devices and/or methods disclosed in Patent Literatures I and II, the white balance adjustment is performed by giving a uniform correction amount of the color saturation to all pixels that constitute the picture or image. Consequently, such techniques may not properly achieve the white balance adjustment.

For example, consider a case where the white balance adjustment is performed on image signals from a vehicle camera that is mounted on a vehicle to capture images forward of the vehicle. When the vehicle camera captures a self-luminous light source such as a traffic light, a street light and the like forward of the vehicle while the vehicle with the vehicle camera travels at night, the self-luminous light source with the color saturation different from that of the light from the road surface or the like appears on the picture since the self-luminous light source emits arbitrary light. In this case, if the white balance adjustment is performed in accordance with the light from the road surface or the like, the white balance adjustment may not be properly performed on the light from the self-luminous light source.

When the vehicle camera simultaneously captures tunnel lamps, which are the self-luminous light sources and scenery or view that can be seen from the tunnel while the vehicle is traveling in the tunnel during the daytime, the white balance adjustment on the scenery may not be properly performed if the white balance adjustment is performed in accordance with the tunnel lamps.

More specifically, when the vehicle camera captures the light from the road surface or the like and the light from the self-luminous light source, the color saturation of the light from the road surface which is a low luminance part differs from that of the light from the self-luminous light source which is a high luminance part. Therefore, the white balance adjustment may not be properly achieved if the white balance adjustment is performed in accordance with the light from the road surface.

Similarly, when the vehicle camera captures the light from the tunnel lamp and the light from the scenery, the color saturation of the light from the tunnel lamp, which is the low luminance part, differs from that of the light from the scenery. Therefore, the white balance adjustment may not be properly achieved if the white balance adjustment is performed in accordance with the light from the tunnel lamps.

Accordingly, an object of the present disclosure is to provide a white balance adjustment device and a white balance adjustment method that can properly perform a white balance adjustment even when the light from the light sources with a plurality of luminance is captured.

To achieve the above object, a present disclosure provides a white balance adjustment device that performs a white balance adjustment on a received image signal. The white balance adjustment device includes a statistics acquisition portion and a correction portion. The statistics acquisition portion includes an area setting portion including a luminance area setting portion that is configured to set a plurality of luminance ranges, and an average value calculation portion that is configured to calculate average values of color difference values of the image signal in each of the plurality of luminance ranges set by the luminance area setting portion. The correction portion includes a correction function determination portion that is configured to determine a correction function of the color difference values of the image signal based on the average value of the color difference values calculated by the average value calculation portion, and a color difference correction portion that is configured to correct the color difference values of the image signal based on the correction function determined by the correction function determination portion.

BRIEF DESCRIPTION OF DRAWINGS

FIG. 11 is a view illustrating a correction function determined by a correction function determination portion according to a third embodiment.

DETAILED DESCRIPTION

Figure 1:
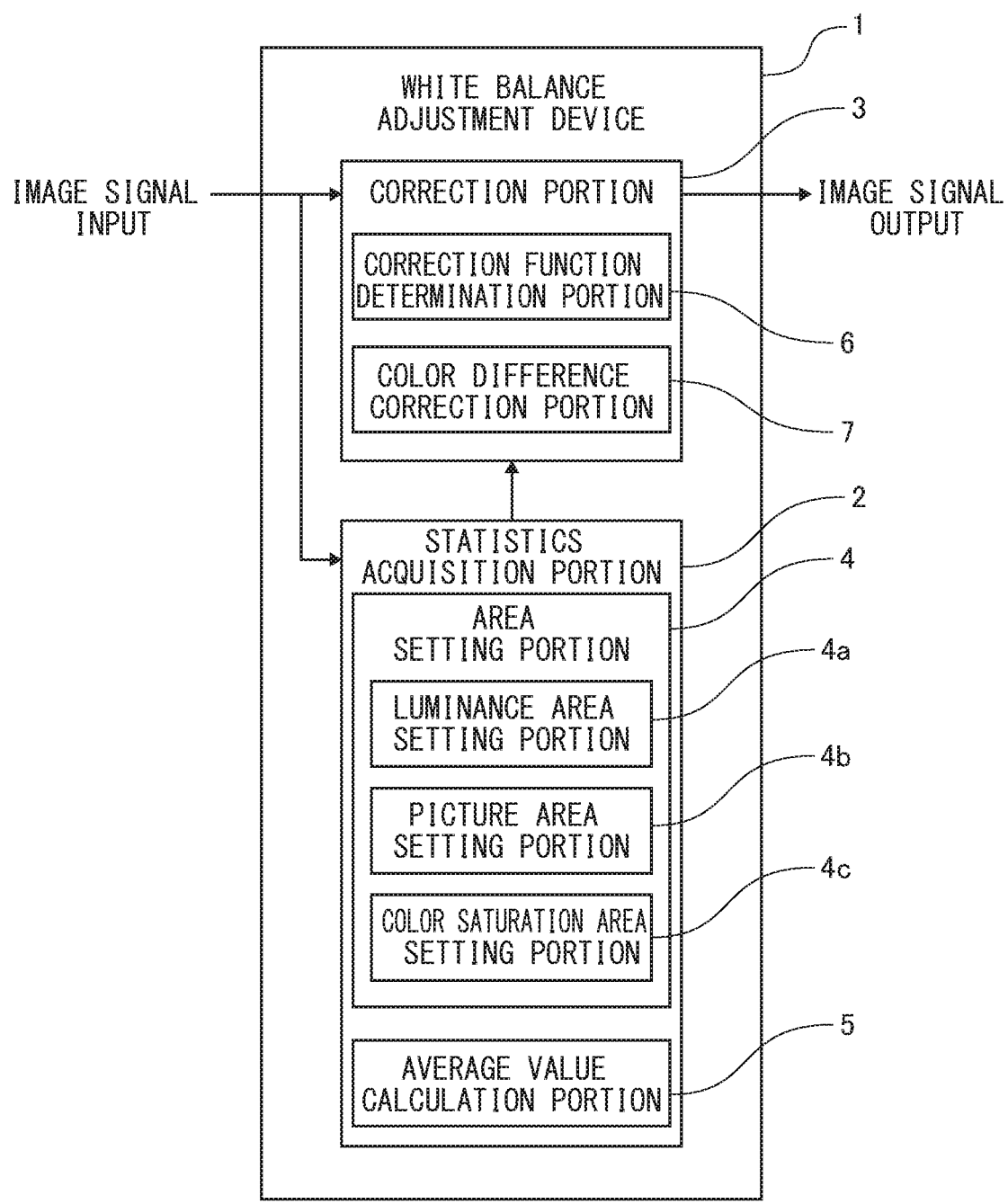
FIG. 1 is a block diagram illustrating a configuration of a white balance adjustment device according to an embodiment of the present disclosure.

Hereinafter, embodiments of the present disclosure will be described with reference to the accompanying drawings. FIG. 1 is a block diagram illustrating a configuration of a white balance adjustment device according to an embodiment of the present disclosure.

A white balance adjustment device 1 according to an embodiment of the present disclosure receives image signals from an imaging device (not shown) such as a vehicle-mounted camera, for example. The image signals input to the white balance adjustment device 1 are image signals in a YUV format. In a case where the imaging device outputs image signals in an RGB format, a conversion system (not shown) is provided upstream of the white balance adjustment device 1 to convert the RGB signals from the imaging device to the YUV signals.

The white balance adjustment device 1 according to the present embodiment includes an arithmetic control portion such as CPU or the like and a storage portion such as ROM, RAM, or the like. During start-up, a control program stored in the storage portion is read and executed by the arithmetic control portion so that the white balance adjustment device 1 is entirely controlled. Then, the white balance adjustment device 1 executes functions of various function implementation portions, which will be described below.

The white balance adjustment device 1 according to the present embodiment includes a statistics acquisition portion 2 and a correction portion 3. The statistics acquisition portion 2 is configured to perform statistical processing on the input image signal. The correction portion 3 is configured to perform the white balance adjustment (in particular, correction of color saturation) on the received image signal based on a result of the statistical processing by the statistics acquisition portion 2.

The statistics acquisition portion 2 includes an area setting portion 4 and an average value calculation portion 5. The area setting portion 4 includes a luminance area setting portion 4a, a picture area setting portion 4b, and a color saturation area setting portion 4c. The luminance area setting portion 4a is configured to set a plurality of luminance ranges. The picture area setting portion 4b is configured to set the range of an image or picture which is displayed according to the image signals. The color saturation area setting portion 4c is configured to set a color saturation range. The average value calculation portion 5 is configured to calculate the average value of color saturation (color difference values in each of the luminance ranges set by the luminance area setting portion 4a.

Further, the correction portion 3 includes a correction function determination portion 6 and a color difference correction portion 7. The correction function determination portion 6 is configured to determine correction functions of the color difference values of the image signals based on the average value of the color difference values calculated by the average value calculation portion 5. The color difference correction portion 7 is configured to correct the color difference values of the image signals in accordance with the correction functions determined by the correction function determination portion 6. These function implementation portions will be described in detail below.

As a result of the correction by the correction portion 3, the image signals output from the white balance adjustment device 1 are provided to a display device such as a display or monitor within the vehicle and the picture (image) is displayed in the display device in accordance with the image signals. Note that well-known image processing such as a gamma correction that is performed when displaying the picture may be performed on the image signals output from the white balance adjustment device 1. Of course, various image processing may be performed in advance on the image signals to be input to the white balance adjustment device 1.

Figure 2:
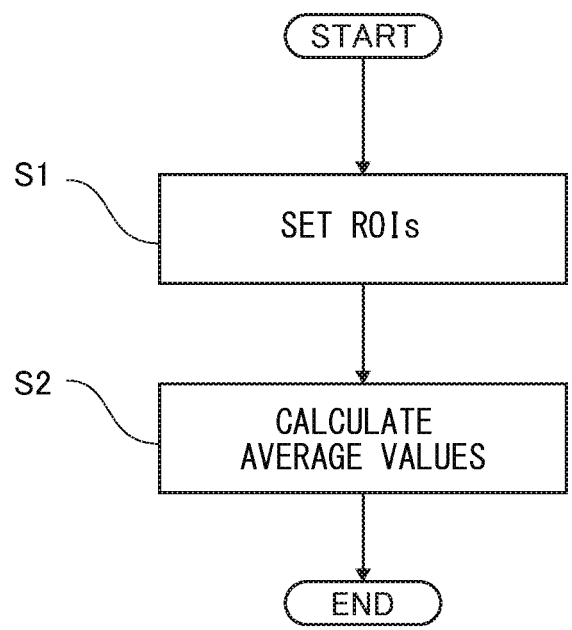
FIG. 2 is a flowchart illustrating the operation of a statistics acquisition portion of the white balance adjustment device according to the embodiment of the present disclosure.

Next, the operation of the statistics acquisition portion 2 of the white balance adjustment device 1 according to the present embodiment will be described with reference to the flowchart shown in FIG. 2 and the drawings in FIG. 3 to FIG. 7.

In Step S1, the area setting portion 4 of the statistics acquisition portion 2 sets ROIs (Region of Interest: target area) in relation to the input image signals.

The ROIs set by the area setting portion 4 (including the luminance area setting portion 4a, the picture area setting portion 4b and the color saturation area setting portion 4c) of the white balance adjustment device 1 according to the present embodiment include image or picture ROI, luminance ROI, and color saturation ROI.

Figure 3:
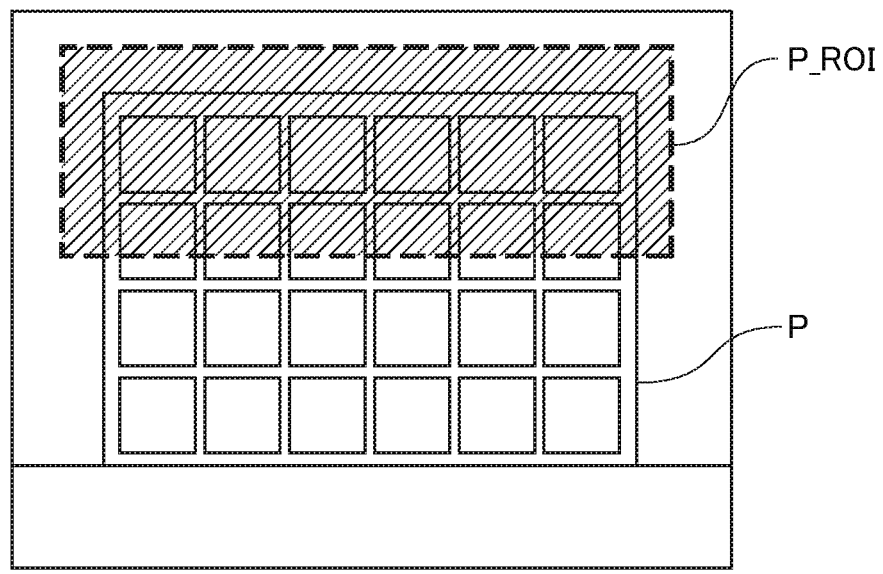
FIG. 3 is a view illustrating an example of a picture ROI set by an area setting portion of the white balance adjustment device according to the embodiment of the present disclosure.

The picture ROI is a range where the white balance adjustment device 1 acquires image signals with a color shift for the white balance adjustment. The calculation by the statistics acquisition portion 2 and the correction portion 3 is performed on the image signals within the range of the picture ROI. For example, as shown in FIG. 3, the picture ROI P_ROI is set at the upper part of the image or picture P which is displayed on the display device by the picture area setting portion 4b.

The picture ROI P_ROI can be arbitrarily set relative to the picture (image) in advance. In the example described above, the picture ROI P_ROI may be set at the bottom half of the picture if the white balance adjustment is to be performed based on the image signals from the road surface, for example.

Figure 4:
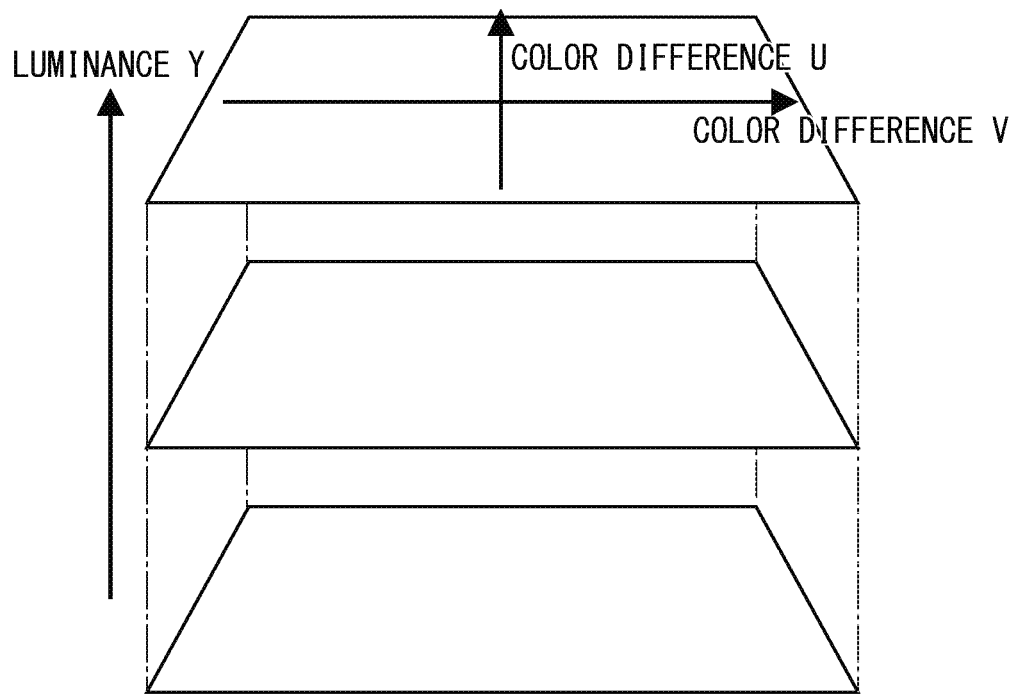
FIG. 4 is a view illustrating a YUV color space.

The luminance ROI is a luminance range for the image signals the white balance adjustment device 1 acquires for the white balance adjustment. The white balance adjustment device 1 according to the present embodiment performs the white balance adjustment with regard to the YIN color space shown in FIG. 4. As shown in FIG. 4, the image signal of each pixel can be represented as a coordinate value in the YUV color space, which is a three-dimensional coordinate system defined by a luminance Y axis, a color difference U axis, and a color difference V axis.

Figure 5:
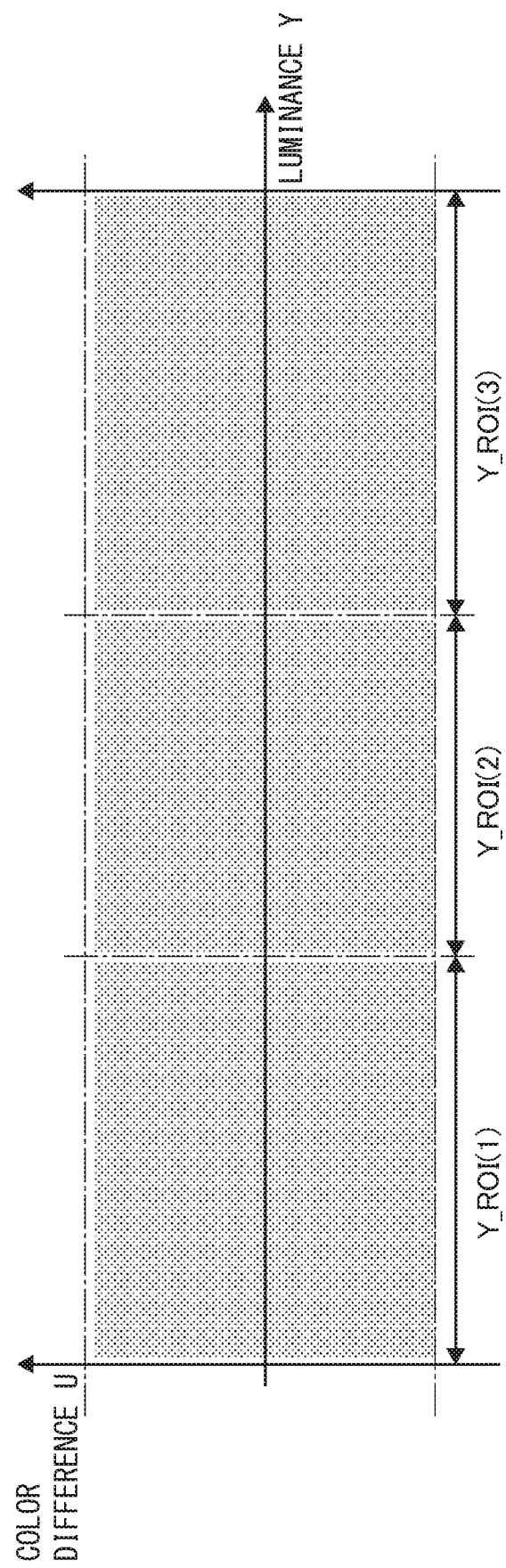
FIG. 5 is a view illustrating an example of a luminance ROI set by the area setting portion of the white balance adjustment device according to the embodiment of the present disclosure.

The luminance ROI is set by the luminance area setting portion 4a. FIG. 5 shows an example of the luminance ROIs Y_ROI(1) to Y_ROI(3) set by the luminance area setting portion 4a. The luminance ROIs Y_ROI(1) to Y_ROI(3) shown in FIG. 5 are represented on a YU plane with the luminance Y on the horizontal axis and the color difference U on the vertical axis as an example. A plurality of the luminance ROIs (three in the illustrated example) are set along the entire luminance ranges of luminance Y.

The luminance ROIs Y_ROI(1) to Y_ROI(3) can be arbitrarily set relative to the entire luminance ranges in advance. In the example described above, if the white balance adjustment is to be performed without the light from the self-luminous light source which is the high luminance part, for example, the luminance ROIs may be set by excluding the luminance corresponding the light from the self-luminous light source. Further, the white balance adjustment can be performed by focusing on the light from the low luminance part and the light from the high luminance part since a plurality of the luminance ROIs Y_ROI(1) to Y_ROI(3) are set.

The color saturation ROI is a color saturation (color difference) range for the image signals the white balance adjustment device 1 acquires.

Figure 6:
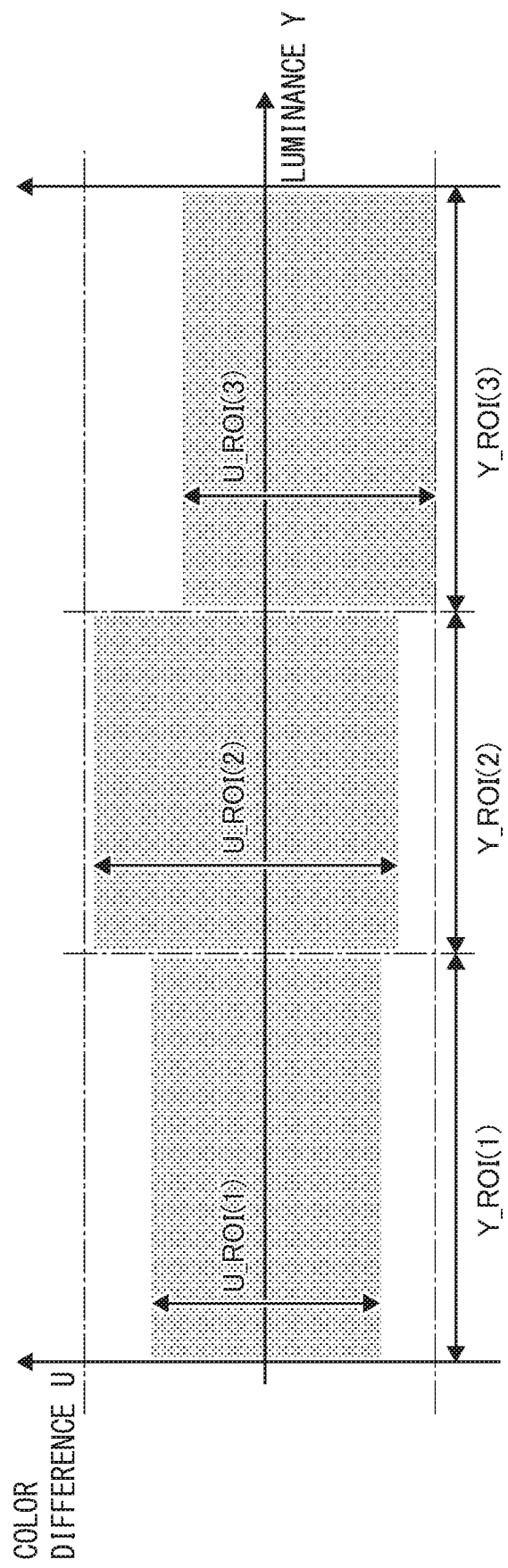
FIG. 6 is a view illustrating an example of a color saturation ROI set by the area setting portion of the white balance adjustment device according to the embodiment of the present disclosure.

The color saturation ROIs are set by the color saturation area setting portion 4c. FIG. 6 shows an example of the color saturation ROIs U_ROI(1) to U_ROI(3) set by the color saturation area setting portion 4c. The color saturation ROIs U_ROI(1) to U_ROI(3) shown in FIG. 6 are also represented on the YU plane similar to the luminance ROIs Y_ROI(1) to Y_ROI(3). A plurality of the color saturation ROIs (three in the illustrated example) is set along the entire luminance ranges of the color difference U.

The number of the color saturation ROIs U_ROI(1) to U_ROI(3) to be set may be the same as that of the luminance ROIs Y_ROI(1) to Y_ROI(3) In particular, as shown in FIG. 6, each of the color saturation ROIs U_ROI(1) to U_ROI(3) may be set corresponding to each of the luminance ROIs Y_ROI(1) to Y_ROI(3). Note that FIG. 6 illustrates one example of the color saturation ROIs U_ROI(1) to U_ROI(3) set on the YU plane, but the color saturation area setting portion 4c similarly sets color saturation ROIs V_ROI on a YV plane.

The color saturation ROIs U_ROI(1) to U_ROI(3) can be arbitrarily set relative to the entire color saturation range in advance. In the example described above, if the white balance adjustment is to be performed without a part of the color saturation (e.g. color saturation in a high color saturation range) from the light from the high color saturation portion such as the self-luminous light source, a signboard, or a billboard, for example, the color saturation ROIs may be set by excluding a specific color saturation range from the light from the high color saturation portion. Further, the white balance adjustment can be performed by focusing on the light including a plurality of color saturation among a plurality of light captured by the imaging device since a plurality of the color saturation ROIs U_ROI(1) to U_ROI(3) are set.

Next, in Step S2, the average value calculation portion 5 of the statistics acquisition portion 2 calculates average values for the image signals of the pixels within the ROI ranges set by the area setting portion 4.

The image signals for which the average values are calculated by the average value calculation portion 5 are image signals of the pixels within the picture ROI range set by the picture area setting portion 4b. Further, the average values are calculated for the luminance within the luminance ROI range set by the luminance area setting portion 4a and the color saturation within the color saturation ROI range set by the color saturation area setting portion 4c with regard to the image signals of the pixels within the picture ROI range.

The average value calculation portion 5 calculates the average values of the luminance and the color saturation (color difference) for each of the luminance ROIs. More specifically, the average value calculation portion 5 calculates the average value U_Ave of the color differences U and the average value Yu_Ave of the luminance Y corresponding to the average value U_Ave with regard to a specific luminance ROI. Similarly, the average value calculation portion 5 calculates the average value V_Ave of the color differences V and the average value Yv_Ave of the luminance Y corresponding to the average value V_Ave.

Figure 7:
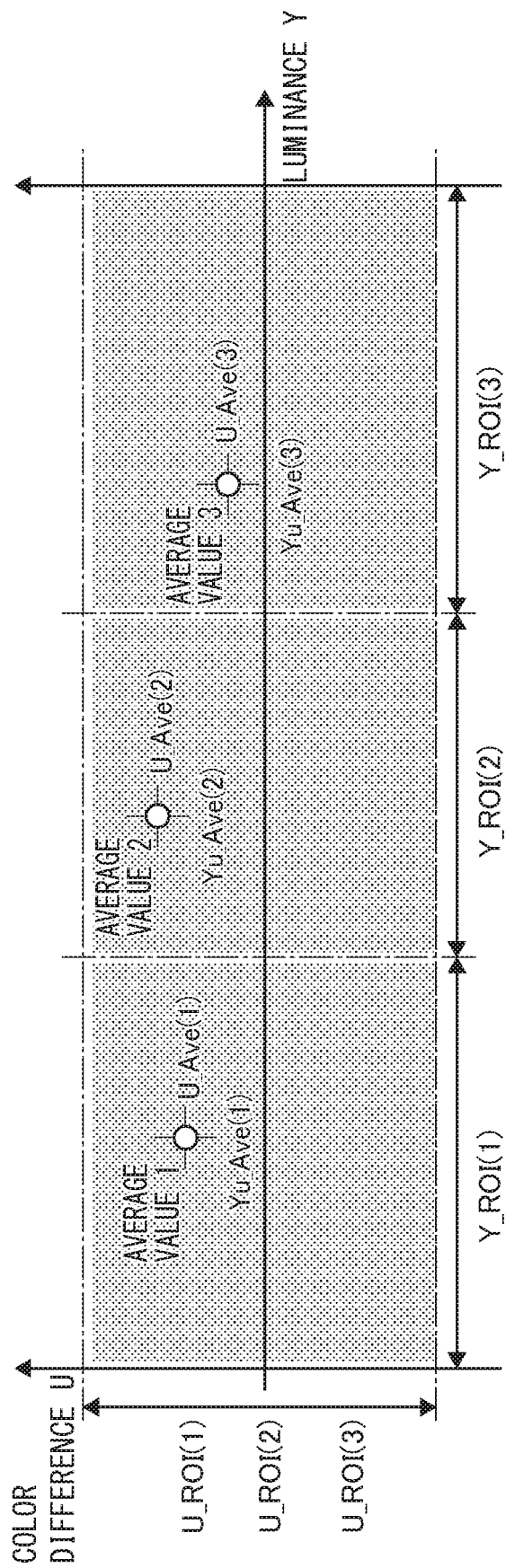
FIG. 7 is a view illustrating an example of average values calculated by an average value calculation portion of the white balance adjustment device according to the embodiment of the present disclosure.

For example, consider the case where three luminance ROIs Y_ROI(1) to Y_ROI(3) are set as shown in FIG. 7. The average value calculation portion 5 calculates the average values U_Ave(1) to U_Ave(3) of the color differences U and correspondingly the average values Yu_Ave(1) to Yu_Ave(3) of the luminance Y in each of the luminance ROIs Y_ROI(1) to Y_ROI(3). In order to simplify the drawings, the color saturation ROIs U_ROI(1) to U_ROI(3) are set to be the same for all of the luminance ROIs Y_ROI(1) to Y_ROI(3).

In Step S2, the average values of the luminance Y, the color differences U, and the color differences V calculated by the average value calculation portion 5 are output to the correction portion 3 as information of the color shifts in the picture ROI that is representative of the image signals from the imaging device.

Next, the operation of the correction portion 3 of the white balance adjustment device 1 according to an embodiment of the present disclosure will be described with reference to the flowchart shown in FIG. 8 and the drawings in FIG. 9 to FIG. 11.

First Embodiment

First, in Step S3, the correction function determination portion 6 of the correction portion 3 defines correction functions to be used for the white balance adjustment based on the average values of the luminance Y, the color differences U, and the color differences V calculated by the average value calculation portion 5 of the statistics acquisition portion 2. Here, the correction functions are functions indicating the color shift information of the image signals from the imaging device, more specifically the color shift information in the picture ROI that is representative of the image signals from the imaging device.

The correction functions in the first embodiment will be described with reference to FIG. 9. In the example shown in FIG. 9, three average values U_Ave(1) to U_Ave(3) of the color differences U and correspondingly the average values Yu_Ave(1) to Yu_Ave(3) of the luminance Y shown in FIG. 7 are provided to the average value calculation portion 5. In the description below, the luminance ROIs Y_ROI(1) to Y_ROI(3) are set as the luminance areas Y_Reg(1) to Y_Reg(3).

The correction functions f(U) of the color differences U in the first embodiment use the average values of the color differences U as representative values in each of the luminance areas Y_Reg(1) to Y_Reg(3). In other words, in each of the luminance areas Y_Reg(1) to Y_Reg(3), the correction functions f(U) of the color differences U are given by the following formulas.

$$Y\_Reg(1){:}f(U1){=}U\_Ave(1)$$

$$Y\_Reg(2){:}f(U2){=}U\_Ave(2)$$

$$Y\_Reg(3){:}f(U3){=}U\_Ave(3) \qquad \text{[FORMULA 1]}$$

In addition, the correction function determination portion 6 also defines the correction functions f(V) of the color differences V similar to the correction functions of the color differences U.

Next, in Step S4, the color difference correction portion 7 of the correction portion 3 calculates the correction functions with regard to all pixels of the image signals from the imaging device based on the correction functions defined in Step S3. Specifically, the luminance value Y_in corresponding to each of the pixels is referenced; the luminance area Y_Reg to which the luminance value Y_in belongs is specified, and then the correction function is calculated for each of the pixels based on the specified luminance area Y_Reg.

Then, in Step S5, the color difference correction portion 7 of the correction portion 3 calculates correction amounts for the color differences U, V in accordance with the correction functions calculated in Step S4. Here, each of the correction amounts is defined by the difference between the calculation result of the correction function and a correction target value (i.e. target value for white balance adjustment). Specifically, the correction amounts are defined by the following formulas.

$$\text{COLOR DIFFERENCE } U \text{ CORRECTION AMOUNT}{=}\text{Target}\_U{-}f(U)$$

$$\text{COLOR DIFFERENCE } V \text{ CORRECTION AMOUNT}{=}\text{Target}\_V{-}f(V) \qquad \text{[FORMULA 2]}$$

Here, Target_U is a correction target value for the color difference U, and Target_V is a correction target value for the color difference V. In the white balance adjustment device 1 according to the present embodiment, each of the correction target values is set to "0" as an example. FIG. 9 shows correction values for each of the luminance areas Y_Reg(1) to Y_Reg(3) with arrows.

Then, in Step S6, the color difference correction portion 7 of the correction portion 3 performs the correction processing based on the correction amounts for the color differences U, V calculated in Step S5. Here, the correction processing is for obtaining, by offsetting the correction amounts corresponding to the pixels from the color difference values, corrected color difference values, more specifically, the color difference values on which the white balance adjustment has been performed. The corrected color difference values, that is the color difference values of the image signals output from the white balance adjustment device 1 are set as "U_in" and "V_in", respectively and the color difference values of the image signals output from the white balance adjustment device 1 are set as "U_out" and "V_out", respectively. Then, the output color difference values U_out and V_out are given by the following formulas.

$$U\_out{=}U\_in{+}(\text{Target}\_U{-}f(U))$$

$$V\_out{=}V\_in{+}(\text{Target}\_V{-}f(V)) \qquad \text{[FORMULA 3]}$$

The color difference correction portion 7 performs the correction processing on all of the pixels. As shown with the above formulas, the color difference correction portion 7 performs the correction processing only on the color differences U, V, but does not perform the correction processing on the luminance Y so that the luminance value of the image signal input from the imaging device remains as it is.

According to the procedure explained above, the white balance adjustment by the white balance adjustment device 1 in the first embodiment is performed. According to the correction method in the present embodiment, the correction processing is performed by setting a plurality of luminance ROIs, calculating the average values of the color differences U, V for each of the luminance ROIs (=the luminance areas), and defining the correction functions based on the average values. Thereby, the white balance adjustment can be properly performed even when different color shifts occur within the picture (image) in the display device, that is when the light from the light sources including a plurality of luminance is captured.

In particular, according to the correction method in the present embodiment, the luminance ROIs may be set in a large number of sections and in very small luminance ranges, and the color shift for each of the luminance areas may be obtained more particularly. Therefore, the accuracy of the white balance adjustment can be improved.

On the other hand, in a case where the white balance adjustment device 1 that uses the correction method of the present embodiment is implemented in an image signal processor provided in a video camera, a digital video camera, or the like, setting the luminance ROIs in a large number of sections increases the calculation scale. In order to perform the white balance adjustment in real-time or at a speed close thereto, it is necessary to implement the image signal processor capable of high-speed calculation. This may increase the implementation cost.

Further, in the correction method of the present embodiment, the correction function that is constant (average value) is defined for each of the luminance areas. Accordingly, there is a possibility that the correction result may be discontinuous at the boundary of the luminance areas. As a result, the color reproducibility of the image signals output from the white balance adjustment device 1 may become unnatural.

Hereinafter, a correction method of the second embodiment in which fewer luminance areas are set and correction functions have continuity will be described.

Second Embodiment

Description for the operation of the statistics acquisition portion 2 in the second embodiment is omitted since the operation is the same as that of the statistics acquisition portion in the first embodiment.

Figure 8:
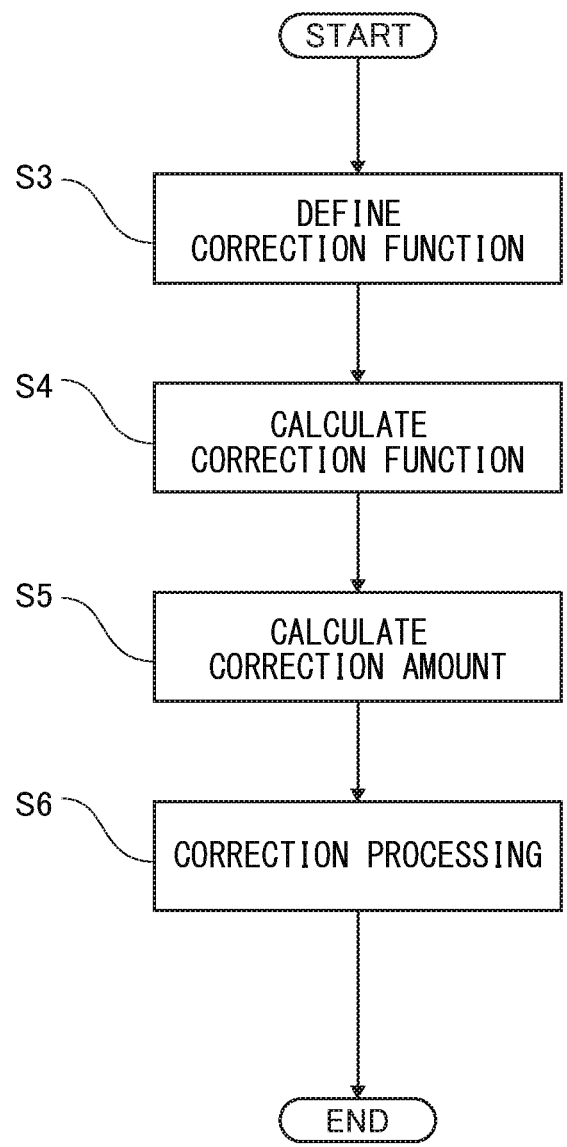
FIG. 8 is a flowchart illustrating the operation of a correction portion of the white balance adjustment device according to the embodiment of the present disclosure.
Figure 9:
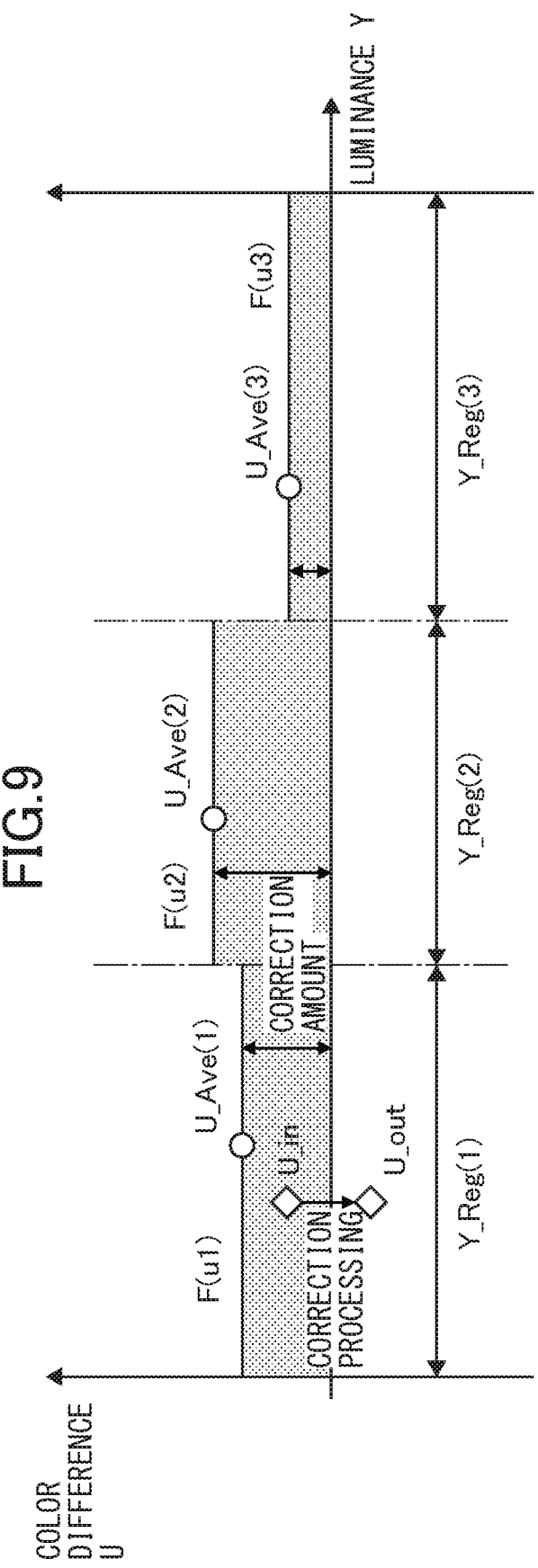
FIG. 9 is a view illustrating a correction function determined by a correction function determination portion according to a first embodiment.

In Step S3 shown in FIG. 8, the correction function determination portion 6 of the correction portion 3 defines correction functions different from those in the first embodiment.

The correction functions in the second embodiment will be described with reference to FIG. 10. Also, in an example shown in FIG. 10, three average values U_Ave(1) to U_Ave (3) of the color differences U and correspondingly the average values Yu_Ave(1) to Yu_Ave(3) of the luminance Y shown in FIG. 7 are provided to the average value calculation portion 5.

The correction functions of the color differences U in the second embodiment are defined as piecewise linear functions for two areas consisting of a straight line connecting the average value U_Ave(1) and the average value U_Ave (2), and a straight line connecting the average value U_Ave (2) and the average value U_Ave(3) on the YU plane. In addition, a luminance area corresponding to the straight line connecting the average value U_Ave(1) and the average value U_Ave(2) is defined as a luminance area Y_Reg(1).

Also, a luminance area corresponding to the straight line connecting the average value U_Ave(2) and the average value U_Ave(3) is defined as a luminance area Y_Reg(2).

Figure 10:
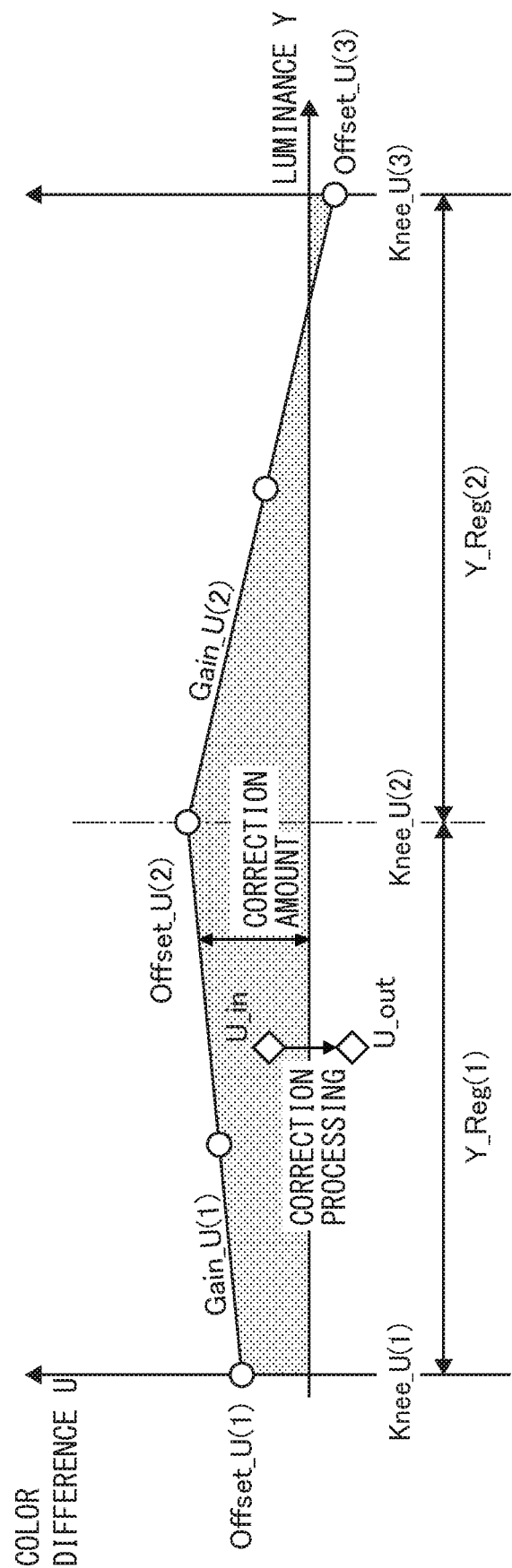
FIG. 10 is a view illustrating a correction function determined by a correction function determination portion according to a second embodiment.

The correction functions shown in FIG. 10, which are the piecewise linear functions, are defined with a plurality of variables (Knee, Offset, Gain). Here, Knee_Us are given by the average values Yu_Ave of the luminance Y. Offset_Us are given by the average values U_Ave of the color differences U. Gain_Us are given by the inclinations of straight lines connecting the average values U_Ave of the color differences U adjacent each other on the YU plane.

Hereinafter, these variables will be described in detail. The lower limit value of the luminance Y is defined as Knee_U(1), and correspondingly the value of the color difference U is defined as Offset_U(1). Also, the upper limit value of the luminance Y is defined as Knee_U(3), and correspondingly the value of the color difference U is defined as Offset_U(3). Knee_U(2) and Offset_U(2) at the boundary between the luminance area Y_Reg(1) and the luminance area Y_Reg(2) are given by the following formulas using the average values Yu_Ave(2) and U_Ave(2).

$$\text{Knee}\_U(2) = Yu\_\text{Ave}(2)$$

$$\text{Offset}\_U(2) = U\_\text{Ave}(2) \quad \text{[FORMULA 4]}$$

Further, the inclination of the piecewise linear function in the luminance area Y_Reg(1) is defined as Gain_U(1), and the inclination of the piecewise linear function in the luminance area Y_Reg(2) is defined as Gain_U(2).

Correspondingly, the correction functions f(U) are given by the following formulas.

$$Y\_\text{Reg}(1): f\_U1(U\_\text{in}) = \text{Gain}\_U(1) \times (Y\_\text{in} - \text{Knee}\_U(1)) + \text{Offset}\_U(1)$$

$$Y\_\text{Reg}(2): f\_U2(U\_\text{in}) = \text{Gain}\_U(2) \times (Y\_\text{in} - \text{Knee}\_U(2)) + \text{Offset}\_U(2) \quad \text{[FORMULA 5]}$$

Also, the correction function determination portion 6 defines the correction functions f(V) of the color difference V similar to the correction functions of the color difference U.

Descriptions of the processes in Step S4 to Step S6 are omitted since these processes are the same as those in the first embodiment. However, the formulas used for the correction amounts and the correction processing are different from those in the first embodiment, which are shown below accordingly. First, formulas for the correction amounts are given by the following formulas.

$$\text{COLOR DIFFERENCE } U \text{ CORRECTION AMOUNT} = \text{Target}\_U - f\_U(U\_\text{in})$$

$$\text{COLOR DIFFERENCE } V \text{ CORRECTION AMOUNT} = \text{Target}\_V - f\_V(V\_\text{in}) \quad \text{[FORMULA 6]}$$

In addition, formulas used for the correction processing are given by the following formulas.

$$U\_\text{out} = U\_\text{in} + (\text{Target}\_U - f\_U(U\_\text{in}))$$

$$V\_\text{out} = V\_\text{in} + (\text{Target}\_V - f\_V(V\_\text{in})) \quad \text{[FORMULA 7]}$$

By the procedure explained above, the white balance adjustment is performed by the white balance adjustment device 1 according to the second embodiment. In the correction method of the present embodiment, the luminance areas Y_Reg(1) and Y_Reg(2) are set between the average values of the color differences U as shown in FIG. 10. Thereby, the number of the luminance areas Y_Reg and accordingly the calculation scale can be reduced compared to the first embodiment. As a result, the cost can be reduced.

In addition, the correction functions are set to be continuous at the boundary between the luminance area Y_Reg(1) and the luminance area Y_Reg(2). Accordingly, the color reproducibility of the image signals output from the white balance adjustment device 1 can be prevented to be unnatural.

On the other hand, in the correction method of the present embodiment, the correction values are calculated in the luminance lower limit and the luminance upper limit (i.e. the values of the correction functions are not "0") as shown in FIG. 10. Accordingly, the correction values which are not "0" are given to the light from the self-luminous light source which is the high luminance part and the light from the low luminance part at night. As a result, the white balance adjustment is performed and the color saturation of the light is changed so that the color shift may occur.

Accordingly, a correction method according to the third embodiment in which correction functions have continuity and correction values in luminance lower and upper limits are considered will be described hereinafter.

Third Embodiment

The description of the operation of the statistics acquisition portion 2 in the third embodiment is omitted since the operation is the same as that of the statistics acquisition portion in the first embodiment.

In Step S3 shown in FIG. 8, the correction function determination portion 6 of the correction portion 3 defines correction functions different from those in the first and second embodiments.

The correction functions according to the third embodiment will be described with reference to FIG. 11. In the example shown in FIG. 11, three average values U_Ave(1) to U_Ave(3) of the color differences U and correspondingly the average values Yu_Ave(1) to Yu_Ave(3) of the luminance Y shown in FIG. 7 are also provided to the average value calculation portion 5.

Similar to the correction functions in the second embodiment, the correction functions of the color differences U in the third embodiment are given by the piecewise linear functions connecting the average values of the color differences U. Further, in the third embodiment, the luminance area Y_Reg(1) is provided between the luminance lower limit and an average value of the color differences U and the luminance area Y_Reg(4) is provided between another average value of the color differences U and the luminance upper limit. Thereby, the correction functions are defined in four luminance areas Y_Reg(1) to Y_Reg(4).

Hereinafter, the variables of the correction functions will be described in detail. The luminance lower limit is defined as Knee_U(1) and the value of the color difference U corresponding to the luminance lower limit is defined as Offset_U(1). Also, the luminance upper limit is defined as Knee_U(5), and the value of the color difference U corresponding to the luminance upper limit is defined as Offset_U(5). In addition, Offset_U(1) equals to Offset_U(5) (i.e. Offset_U(1)=Offset_U(5)) both of which are on the luminance Y axis (i.e. value 0).

In addition, the average values of the Luminance Y corresponding to the average values of the color differences U are defined as Knee_U(2), Knee_U(3), and Knee_U(4) in the order from a lower side, which are represented by the following formulas.

$$\text{Knee}\_U(2) = Yu\_\text{Ave}(1)$$

$$\text{Knee}\_U(3) = Yu\_\text{Ave}(2)$$

$$\text{Knee}\_U(4) = Yu\_\text{Ave}(3) \quad \text{[FORMULA 8]}$$

The average values of the color differences U are defined as Offset_U(2), Offset_U(3), and Offset_U(4) in the order from the lower side of the luminance Y, which are represented by the following formulas.

$$\text{Offset\_}U(2)=U\_\text{Ave}(1)$$

$$\text{Offset\_}U(3)=U\_\text{Ave}(2)$$

$$\text{Offset\_}U(4)=U\_\text{Ave}(3) \quad \text{[FORMULA 9]}$$

The inclinations of the straight lines of the correction functions connecting changing points in an area consisting of Knees and Offsets are defined as Gain_U(1), Gain_U(2), Gain_U(3), Gain_U(4), and Gain_U(5) in the order from the lower side of the luminance Y. In addition, the luminance areas are defined as Y_Reg(1), Y_Reg(2), Y_Reg(3), Y_Reg(4), and Y_Reg(5) in the order from the lower side of the luminance Y.

The correction functions f(U) in this case are given by the following formulas.

$$Y\_\text{Reg}(1){:}f\_U1(U\_\text{in})=\text{Gain\_}U(1)\times(Y\_\text{in}-\text{Knee\_}U(1))+\text{Offset\_}U(1)$$

$$Y\_\text{Reg}(2){:}f\_U2(U\_\text{in})=\text{Gain\_}U(2)\times(Y\_\text{in}-\text{Knee\_}U(2))+\text{Offset\_}U(2)$$

$$Y\_\text{Reg}(3){:}f\_U3(U\_\text{in})=\text{Gain\_}U(3)\times(Y\_\text{in}-\text{Knee\_}U(3))+\text{Offset\_}U(3)$$

$$Y\_\text{Reg}(4){:}f\_U4(U\_\text{in})=\text{Gain\_}U(4)\times(Y\_\text{in}-\text{Knee\_}U(4))+\text{Offset\_}U(4)$$

$$Y\_\text{Reg}(5){:}f\_U5(U\_\text{in})=\text{Gain\_}U(5)\times(Y\_\text{in}-\text{Knee\_}U(5))+\text{Offset\_}U(5) \quad \text{[FORMULA 10]}$$

Also, the correction function determination portion 6 defines the correction functions f(V) of the color differences V similar to the correction functions of the color differences U.

Descriptions of processes in Step S4 to Step S6 are omitted since these processes are the same as those of the second embodiment.

By the procedure explained above, the white balance adjustment of the white balance adjustment device 1 according to the third embodiment is performed. In the correction method of the present embodiment, the correction values in the luminance lower limit and the luminance upper limit are set to "0", respectively as shown in FIG. 11. Accordingly, the correction amounts of the image signal become smaller as being closer to the lower limit and the upper limit of the luminance values of the image signal. As a result, the white balance adjustment can be performed without the color shift on the light from the self-luminous light source which is the high luminance part and the light from the low luminance part at night.

The relation between the operation of the statistics acquisition portion 2 and the operation of the correction portion 3 will be described. The operations of the statistics acquisition portion 2 and the correction portion 3 may be performed sequentially or in parallel. In other words, the operations of the statistics acquisition portion 2 and the correction portion 3 are performed in a picture (image) unit as described above, that is in a frame unit of the image signals from the imaging device. Accordingly, the operation of the correction portion 3 may be performed on the image signals of one frame after the operation of the statistics acquisition portion 2 on the image signals of this frame is finished. Alternatively, the operation of the statistics acquisition portion 2 may be performed on image signals of a frame before a frame currently transmitted from the imaging device and the calculation of the correction portion 3 may be performed on the image signals of the current frame based on the calculation result of the statistics acquisition portion 2 on the image signals of the frame before the current frame. In this way, the white balance adjustment can be performed in real-time by operating the statistics acquisition portion 2 and the correction portion 3 in parallel.

In the white balance adjustment device 1 of the present embodiment configured as described above, the correction function determination portion 6 determines the correction functions of the color difference values of the image signal based on the average values of the color difference values of the image signal in each of the luminance ranges set by the luminance area setting portion 4a. Then, the color difference correction portion 7 corrects the color difference values of the image signal based on the correction functions determined by the correction function determination portion 6.

Thereby, even when the light from the light sources including a plurality of luminance in the image signal appears, the white balance adjustment can be performed according to the light from each of the light sources by properly sating the luminance ranges. Consequently, it is possible to provide the white balance adjustment device 1 and the white balance adjustment method that can effectively perform the white balance adjustment even when the light from the light sources including a plurality of luminance is captured.

The area setting portion 4 includes the luminance area setting portion 4a, the picture area setting portion 4b for setting the picture range displayed according to the image signals, and the color saturation area setting portion 4c for setting the color saturation range. Accordingly, by properly setting the ranges by the picture area setting portion 4b and the color saturation area setting portion 4c, the white balance adjustment can be properly performed depending on the range of the picture (image) displayed according to the image signals in which the light from the light source appears and/or depending on the deviation of the color saturation of the light from the light sources.

In addition, the average value calculation portion 5 calculates the average value of the color difference values of the image signal corresponding to the picture range set by the picture area setting portion 4b. The color difference correction portion 7 corrects the color difference values of the image signal corresponding the picture range set by the picture area setting portion 4b. Consequently, the white balance adjustment can be more properly performed by appropriately setting the picture range.

Moreover, the correction function determination portion 6 determines the correction functions in which the correction amounts of the image signal become smaller as being closer to the lower limit and the upper limit of the luminance values of the image signal. Thereby, the white balance adjustment can be properly performed to the light from the high luminance part or the low luminance part.

The embodiments of the present disclosure have been described in detail with reference to the drawings. However, the specific configurations are not limited to those in the above embodiments. The present disclosure includes design changes within the scope of the present disclosure.

As an example, the correction functions are defined for the color differences U and the color differences V respectively in the above embodiments. However, it is also possible to use a correction function that includes variables relating to the color difference U and the color difference V in the three-dimensional YUV space at the same time. In other words, the correction function that is defined in the three-dimensional YUV space may be used.

In addition, the result of the correction processing of the white balance adjustment device 1 according to the above embodiments may be adjusted or modified. For example, it may be possible to set a to the correction amount calculated by the color difference correction portion 7 of the correction portion 3. This may be represented by the following formulas.

$$U\_out = U\_in + Coef\_U \times (Target\_U - f\_U(U\_in))$$

$$V\_out = V\_in + Coef\_V \times (Target\_V - f\_V(V\_in)) \quad \text{[FORMULA 11]}$$

Here, Coef_U and Coef_V are correction amount adjustment coefficients of the color difference U and the color difference V, respectively. Coef_U is equal to or larger than "0" and equal to or smaller than "1" (i.e. $0 \leq Coef\_U \leq 1$). Also, Coef_V is equal to or larger than "0" and equal to or smaller than "1" (i.e. $0 \leq Coef\_V \leq 1$). The correction amount adjustment coefficients may be set and change upon and/or after implementing the white balance adjustment device.

The limitation of the correction amounts as described above can avoid the white balance adjustment result that makes people feel uncomfortable due to the overcorrection of the color saturation even with regard to image signals in which chromatic colors occupy most of the picture or image, for example.

The invention claimed is:

1. A white balance adjustment device that performs a white balance adjustment on an image signal to be received comprising:
   a statistics acquisition portion, and
   a correction portion,
   wherein the statistics acquisition portion comprises:
      an area setting portion comprising a luminance area setting portion that is configured to set a plurality of luminance ranges; and
      an average value calculation portion that is configured to calculate an average value of color difference values of the image signal in each of the plurality of luminance ranges set by the luminance area setting portion,
   wherein the correction portion comprises:
      a correction function determination portion that is configured to determine a correction function of the color difference values of the image signal based on the average value of the color difference values calculated by the average value calculation portion; and
      a color difference correction portion that is configured to correct the color difference values of the image signal based on the correction function determined by the correction function determination portion.

2. The device according to claim 1,
   wherein the area setting portion comprises:
      a luminance area setting portion;
      a picture area setting portion that is configured to set a picture range displayed according to the image signal; and
      a color saturation area setting portion that is configured to set a color saturation range.

3. The device according to claim 2,
   wherein the average value calculation portion is further configured to calculate an average value of the color difference values of the image signal corresponding to the picture range set by the picture area setting portion; and
   wherein the color difference correction portion is further configured to correct the color difference values of the image signal corresponding to the picture range set by the picture area setting portion.

4. The device according to claim 1, wherein the correction function determination portion is further configured to determine a correction function where a correction amount of the image signal becomes smaller as being closer to a lower limit and an upper limit of luminance values of the image signal.

5. A white balance adjustment method by a white balance adjustment device that performs a white balance adjustment on an image signal to be received,
   wherein the method comprises:
   setting a plurality of luminance ranges;
   calculating an average value of color difference values of the image signal in each of the set luminance ranges;
   determining a correction function of the color difference values of the image signal based on the average value of the calculated color difference values; and
   correcting the color difference values of the image signal based on the determined correction function.

* * * * *